Inventor
Anthony F. Benning
By Robert G. Lavender
Attorney

Patented May 2, 1950

2,505,877

UNITED STATES PATENT OFFICE 2,505,877

VAPOR PHASE FLUORINATION PROCESS

Anthony F. Benning, Woodstown, N. J., assignor to the United States of America as represented by the United States Atomic Energy Commission Application August 31, 1944, Serial No. 552,182

4 Claims. (Cl. 260—648)

This invention relates to the vapor phase fluorination of organic compounds by means of elemental fluorine.

In the past it has been proposed to fluorinate organic compounds by elemental fluorine employing a catalyst comprising silver, cobalt, manganese, or cerium fluorides deposited on a suitable catalyst support such as copper or another heat-conductive metal which is not too seriously affected by the reagents.

The fluorination process using elemental fluorine is one in which a complete combustion of the hydrocarbon to carbon tetrafluoride and hydrogen fluoride is normally competing at a substantial rate with the desired fluorination. Hence in conducting the process, it is necessary to avoid contact of the elemental fluorine with the organic compound in the absence of catalyst if excessive decomposition is to be avoided. Thus the reaction differs from ordinary catalytic reactions which are carried out under conditions at which substantially no reaction of the materials takes place in the absence of a catalyst.

In order that intermingling of fluorine with the compound being treated may be avoided except in contact with a catalyst, it has been proposed to introduce the two reagents separately into a catalyst chamber, the inlet end of which is divided by a barrier into two separate compartments, one for the fluorine inlet and the other for the organic compound inlet. However, in the fluorination of hydrocarbons, particularly high-boiling hydrocarbons, it has been found that even with this precaution excessive decomposition takes place; the intensity of the reaction in the early portion of the reaction zone has actually resulted in the fusion of the copper catalyst support to such an extent that the apparatus has been rendered inoperative.

It is an object of the present invention to provide improvements in the apparatus and process for effecting fluorinations by means of elemental fluorine whereby substantially more effective control of the reaction can be attained and the reaction can be carried out without injury to the apparatus and with relatively high yields of the desired fluorination products. These objects are accomplished in accordance with the present invention by the provision of relatively massive thermally conductive bodies as a catalyst support to effect the rapid conduction of intense localized heat at the catalyst surface into the interior of the catalyst particles and eliminate high temperature spots which would otherwise cause fusion of the catalyst support.

Preferably the apparatus of the invention comprises a catalyst chamber containing a pervious body of fluorination catalyst and having at one end an inlet for the organic compound to be fluorinated and a separate inlet for elemental fluorine, and at the other end, an outlet for reaction products. At the inlet end massive thermally conductive bodies are provided in contact with the catalyst mass, and the initial portions of the catalyst mass itself comprise catalytic material supported upon a thermally conductive carrier relatively massive, that is, having a substantially greater mass to area ratio, compared to the portions of the catalyst in the zones farther along in the direction of gas flow. It is not important that the massive bodies at the inlet end be coated with catalyst, and they may be left completely uncoated if the apparatus is one provided with a barrier extending a substantial distance into the mass. There will be little or no intermingling of fluorine and organic material in contact with these massive particles, and therefore no reaction will take place at this point whether the masses are coated with catalyst or not. The purpose of these massive elements is to conduct the heat of reaction away from the initial catalyst mass, and this is accomplished equally as well with uncoated masses as with coated masses.

The early portions of the catalyst zone may be packed with coarse particles of suitably coated catalyst support only or with a mixture of coarse and fine particles. The relative proportions of coarse and fine support material may vary in the direction of the flow of gases, the finest particles being present in only small proportions in the early zones, and in gradually increasing proportions progressing toward the outlet end of the apparatus. The final reaction zone may comprise only the fine catalyst support material. The inlets are so arranged that the fluorine and organic compound enter separate portions of the catalyst mass and mix gradually by diffusion through it.

The apparatus of the invention is capable of numerous variations, and in order to provide a better understanding of its operation, several preferred embodiments are illustrated in the accompanying drawings, wherein.

Figure 1:
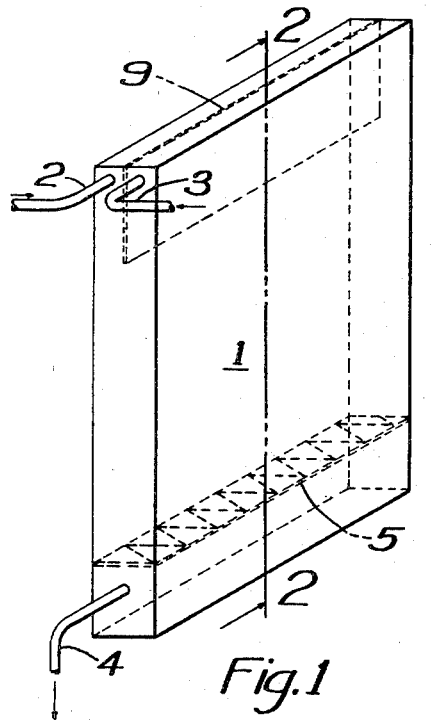
Figure 1 is a perspective view showing diagrammatically a simple form of catalyst chamber.
Figure 2:
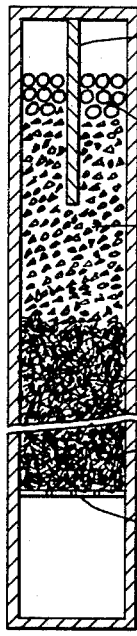
Figures 2, 3 and 4 are enlarged sections on line 2—2 of Figure 1 showing three alternative schemes for arranging catalyst in the chamber in accordance with the teachings of the present invention.

With particular reference to Figures 1 and 2 the numeral 1 designates a vertical catalyst chamber having an inlet 2 for organic compounds and an inlet 3 for fluorine at the top, and an outlet 4 for reaction products at the bottom. Spaced somewhat above the bottom of chamber 1, a supporting grid 5 is provided within the chamber for supporting the catalyst mass.

The catalyst mass comprises a lower section 6, constituting from about ½ to about ⅘ of the entire reaction space and consisting of silver-plated copper turnings or fine silverplated copper wire such as number 30 gauge, and an upper section 7 consisting of a heavier copper material similarly coated.

A third section 8 comprising copper material similar to that in section 7 but uncoated may be provided. Since this section is provided for heat dissipation only, it is immaterial whether the surface is silver-plated or not. In operation the material on the fluorine inlet side becomes coated with metal fluoride and remains in this condition and the material on the organic compound inlet side remains metallic.

A catalyst body composed of a section 8 comprising one part by weight of #3 copper tacks (unplated), above and directly upon a section 7 comprising 10 parts by weight of silver-plated #3 copper tacks, above a section 6 comprising 21 parts by weight of silver-plated copper turnings, the packing in each section being indiscriminately arranged, has served very satisfactorily. A mixture of copper tacks with copper turnings (both plated) may be used in section 7, and satisfactory results have been obtained with mixtures comprising ⅓ part by weight up to 2 parts by weight of #1½ copper tacks for each part by weight of copper turnings.

Between inlets 2 and 3 a vertical barrier 9 extends down into the catalyst mass sufficiently far to prevent intermingling of fluorine and organic compounds in the space above the active catalyst mass. The length of the barrier 9 may be varied to suit the type of catalyst mass employed as well as the total height of the catalyst chamber. If a catalyst mass which during operation may settle and enlarge the space above the top of the body of the catalyst, is employed, a barrier ample to take this into account should be provided. In a catalyst chamber 60 inches tall, the barrier may extend 4 to 12 inches down from the top of the chamber.

The apparatus described may be operated for the production of fluorocarbons in the following manner. The plated copper is treated to form a coating of silver difluoride by passing fluorine diluted with nitrogen through the apparatus for several hours at about 290° C.

A mixture of lubricating oil vapor and nitrogen preheated to a temperature of about 300° C. and comprising about 6 cubic feet of nitrogen (NTP) for each 50 cubic centimeters of liquid oil is introduced at 2 and a mixture of an equal volume of nitrogen and about 400 grams of fluorine is introduced at 3 for each 50 cubic centimeters of liquid oil to be treated. The temperature of the reactor is maintained between 150° and 400° C., preferably at about 300° C. Reaction products are withdrawn at 4 and passed to a suitable condensing system to recover the fluorinated hydrocarbon, hydrogen fluoride, and any partially reacted compounds. The product may be separated from hydrogen fluoride in a conventional manner, for instance, by washing with aqueous 5% NaOH solution.

It is sometimes advantageous to subject the fluorination product to a further fluorination treatment to replace the final small proportions of hydrogen. This may be accomplished by recycling the product or by passing it through a second reactor, which may be a simple catalyst chamber provided with a single zone of finely distributed catalyst. Since the reactivity of fluorine with the product is substantially less violent than with the hydrocarbon used as starting material, the massive catalyst supporting elements may be omitted.

In preparing the catalyst chamber for operation, the copper may be plated with silver by a conventional plating process, and the plated copper may then be treated to form a coating of silver difluoride by passing fluorine diluted with nitrogen through the apparatus for several hours at about 290° C.

After the apparatus has been used for a considerable period, the catalyst activity becomes impaired. In order to restore the catalyst to its original effectiveness, the following procedure may be used.

Fluorine diluted with nitrogen is passed through the reactor at about 300° C. until a strong fluorine test on potassium iodide paper is obtained at the outlet. Passage of the fluorine is continued for another hour. This treatment removes any hydrocarbon material in the catalyst mass. The reactor is then cooled below 100° C. and filled with water. After 30 minutes, the water is drained out, and the reactor is washed with aqueous 0.5% NaOH solution until the wash water is no longer acid to Congo red indicator paper.

The reactor is then drained of wash water and filled with an aqueous solution containing about 6% NaCN, about 0.04% NaOH, and about 9% AgNO₃. After the plating solution has remained in the reactor for 4 hours, it is drained off and the reactor is washed several times with water.

After the final washing, the reactor is heated to about 300° C. while filled with nitrogen and the silver-plated catalyst mass is then activated by passing a mixture of nitrogen and fluorine through in the manner previously described.

Figure 3:
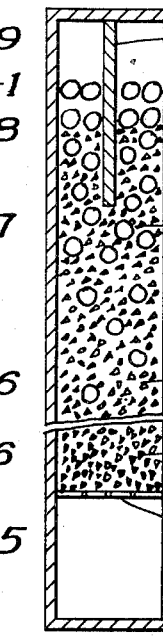

In the arrangement shown in Figure 3, the catalyst chamber 1 has the lowermost zone 6a filled with finely divided copper coated with silver fluoride catalyst, and above this zone successive zones 7a in which the finely divided silver fluoride coated copper is mixed with progressively increasing proportions of more massive copper coated with silver fluoride catalyst until at the top only the silver fluoride coated massive copper is provided.

The method of using the catalyst arrangement of Figure 3 is the same as described for the arrangement of Figure 1.

Figure 4:
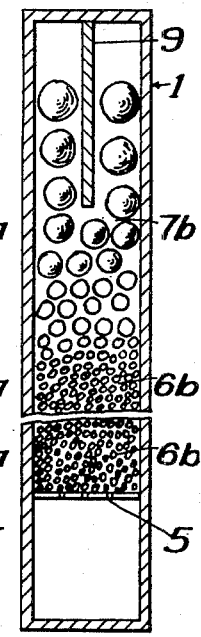

In the catalyst arrangement of Figure 4 the packing is composed of a lowermost catalyst zone 6b, comprising finely divided copper coated with silver fluoride, and a series of zones 7b, in which the catalyst consists of silver fluoride coated copper material of gradually increasing mass, the most massive material being placed at the top.

The method of using the catalyst arrangement of this figure is the same as for Figures 1 to 3.

Figure 5:
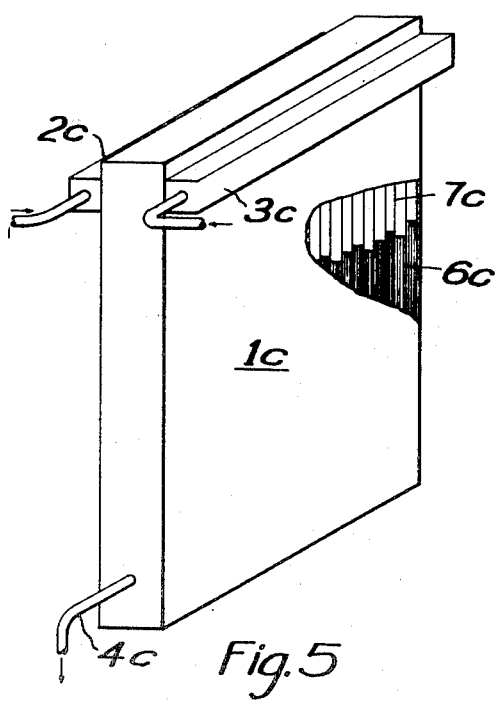
Figure 5 is a perspective view showing an alternative catalyst chamber; a portion of one side is broken away to show the catalyst arrangement within the chamber.
Figure 6:
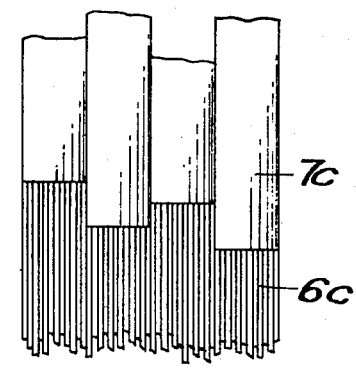
Figure 6 is an enlarged detail showing the junction of the catalyst bodies of Figure 5.

In Figure 5, a slightly different form of apparatus is illustrated, likewise embodying the essentials of the invention. In this apparatus, a chamber 1c has inlet manifold 2c for organic compounds and inlet manifold 3c for fluorine near the top, and outlet 4c at the bottom. Within the chamber 1c and supported by a grid, not shown in this figure but positioned as shown in Figure 1, there are arranged vertical cylindrical silver fluoride coated copper filaments, such as 0.255 inch diameter wire, forming a lower catalyst zone 6c. The filaments are packed coaxially providing vertical channels. The only passages for horizontal flow result from the surface irregularities of the filaments. Above the zone 6c are similar but heavier filaments or rods, such as 0.765 inch diameter silver fluoride coated copper wire, forming a zone 7c. In order to avoid a short channel across the chamber at the margin between zones 6c and 7c, the length of the rods in these zones may be varied so that they form an irregular boundary between the two zones. In this event the relative sizes of the filaments in the two zones should be selected so that a definite number of the smaller filaments will snugly fit the same cross section as the larger filament which their ends abut. As a further alternative the rod-packed zone 7c may be used with an indiscriminately packed zone 6, such as employed in the apparatus of Figures 1 and 2, in place of the filament-packed zone 6c.

In this apparatus, the operation is similar to that in the apparatuses previously described. A mixture of fluorine and nitrogen is introduced at 3c, and a mixture of organic compounds and nitrogen at 2c. The gases diffuse slowly through the cross-section but relatively rapidly in a vertical direction in the channels formed by the circular rods. Consequently the mixing of fluorine and organic compounds takes place very uniformly throughout the length of the reaction chamber.

It will be understood that I intend to include variations and modifications of the invention and that the preceding examples are illustrations only and in no wise to be construed as limitations upon the invention, the scope of which is defined in the appended claims, wherein I claim:

1. The method of fluorinating an organic compound in vapor phase by means of elemental fluorine which comprises separately introducing the organic compound in vapor phase and elemental fluorine into a permeable body of a fluorination catalyst which consists of copper particles having a silver fluoride coating thereupon, said copper particles having a diminishing mass to area ratio in the direction of gas flow, and withdrawing reaction products from said body of catalyst.

2. A method as defined in claim 1 wherein said fluorination catalyst is maintained at a temperature between 150° C. and 400° C.

3. The method of fluorinating a high-boiling hydrocarbon lubricating oil by means of elemental fluorine which comprises passing said oil in vapor phase and elemental fluorine through separate permeable masses of copper particles into separate portions of a single permeable body of a fluorination catalyst maintained at a temperature between 150° C. and 400° C., said fluorination catalyst consisting of copper particles having a silver fluoride coating thereupon and having a diminishing mass to area ratio in the direction of gas flow, and withdrawing reaction products from said body of catalyst.

4. The method of fluorinating a high-boiling hydrocarbon lubricating oil by means of elemental fluorine which comprises passing vapor of said oil diluted with nitrogen and fluorine diluted with nitrogen separately into a permeable body of a fluorination catalyst consisting of copper particles having a silver fluoride coating thereupon and having a diminishing mass to area ratio in the direction of gas flow, withdrawing reaction products from said body of catalyst until the activity of the catalyst becomes impaired; then restoring the activity of the catalyst by a series of steps including in succession passage of fluorine through the catalyst body to remove any hydrocarbon material therefrom, washing the catalyst body with water and with a dilute alkali solution until the wash water is no longer acid, replating the copper particles of the catalyst with silver by contacting them with an aqueous solution containing about 6% of NaCN, about 0.04% of NaOH and about 9% of $AgNO_3$, washing the replated copper particles with water, drying said particles in an atmosphere of nitrogen, passing a mixture of nitrogen and fluorine through said replaced copper particles to convert some of the silver plated thereon to silver fluoride; and then using said reactivated catalyst in the fluorination of more lubricating oil.

ANTHONY F. BENNING.

REFERENCES CITED

The following references are of record in the file of this patent:

UNITED STATES PATENTS

| Number | Name | Date |
|---|---|---|
| 1,851,970 | Askenasy et al. | Apr. 5, 1932 |
| 2,013,030 | Calcott et al. | Sept. 3, 1935 |
| 2,090,772 | Wiezevich | Aug. 24, 1937 |
| 2,142,678 | Porter | Jan. 3, 1939 |
| 2,162,532 | Flemming et al. | June 13, 1939 |
| 2,280,928 | Pie | Apr. 28, 1942 |
| 2,283,499 | Hachmuth | May 19, 1942 |

OTHER REFERENCES

Fukuhara et al.: "Jour. Am. Chem. Soc.," vol. 63, pages 788-9, 2792-5 (1941).